United States Patent [19]

Amitay et al.

[11] Patent Number: 4,604,624

[45] Date of Patent: Aug. 5, 1986

[54] PHASED ARRAY ANTENNA EMPLOYING LINEAR SCAN FOR WIDE-ANGLE ARC COVERAGE WITH POLARIZATION MATCHING

[75] Inventors: Noach Amitay, Tinton Falls; Michael J. Gans, Monmouth Beach, both of N.J.

[73] Assignee: AT&T Bell Laboratories, Murray Hill, N.J.

[21] Appl. No.: 442,237

[22] Filed: Nov. 16, 1982

[51] Int. Cl.[4] ...................... H01Q 21/06; H01Q 21/24; H04B 7/10

[52] U.S. Cl. .................................... 343/361; 343/756; 343/781 P

[58] Field of Search ............... 343/361, 368, 372, 756, 343/781 P

[56] References Cited

U.S. PATENT DOCUMENTS 4,413,263 11/1983 Amitay et al. ...................... 343/756

*Primary Examiner*—Theodore M. Blum
*Assistant Examiner*—Brian S. Steinberger
*Attorney, Agent, or Firm*—Erwin W. Pfeifle

[57] ABSTRACT

The present invention relates to an antenna arrangement which includes a polarization diplexer capable of bidirectionally directing two orthogonally polarized signals along one path in the far field of the antenna arrangement and along two separate paths in the near field for interception along at least one of the paths by an array of feed elements. The array is arranged to provide a fixed linear phase taper along one axis across the array to produce or intercept a beam squinted at an angle 90 degrees-$\alpha$ to the face of the array and including a signal polarized in a first direction. Phase shifting means selectively produce a linear phase taper along a second axis across the face of the array orthogonal to the first axis to cause the beam to traverse a predetermined arc in the far field of view. Polarization mismatch at the array from the diplexer is overcome by providing a single properly inclined 90 degree polarization rotator or by two properly inclined 90 degree polarization rotators depending on the direction of polarization and whether the array is a linear or a two-dimensional array.

4 Claims, 4 Drawing Figures

PHASED ARRAY ANTENNA EMPLOYING LINEAR SCAN FOR WIDE-ANGLE ARC COVERAGE WITH POLARIZATION MATCHING

BACKGROUND OF THE INVENTION

1. Field of the Invention

The present invention relates to an antenna arrangement including a phased array which has a fixed phase taper along one axis across the face of the array and a selective phase taper along a second orthogonal axis across the face of the array to provide a beam which is squinted at an angle 90 degrees-$\alpha$ including signals with a first polarization direction. A single properly inclined polarization rotator or two properly inclined polarization rotators are provided in the path between the array and a polarization diplexer depending on the direction of polarization and whether the array is a linear or a two-dimensional array to provide the polarization matching at the array.

2. Description of the Prior Art

With high capacity satellite communication systems as with subscription program satellite systems vendors or users, ground stations may wish to communicate with two or more satellites positioned at different locations along the Geosynchronous Equatorial Arc (GEA). At present, a separate ground station antenna would be used to communicate with each satellite of the system making ground stations more complex and costly. A single antenna that can track, or simultaneously or sequentially communicate with, all satellites of interest could circumvent the above problems.

Movable antennas, which are well known in the art, could be used for tracking purposes or for communicating with one or more satellites, but such type of antennas are not useful when fast switching between multiple satellites is required. Multibeam reflector antennas using separate feedhorns are also well known in the art and have been suggested for satellite ground stations. In such antennas, oversized reflectors may be required while the scanning capability of others may be limited by excessive gain loss. With some of the specially designed and aberration correcting multireflector antennas with multiple feeds, for example, for a 0.5 degree beamwidth and 45 degrees of GEA coverage, a $\pm 45$ beamwidth scan capability is required. Such severe requirement introduces an antenna gain loss of 1 dB or more due to phase aberrations, as well as imposing a cumbersome antenna structure.

In the abstract "Narrow Multibeam Satellite Ground Station Antenna Employing a Linear Array with a Geosynchronous Arc Coverage of 60°" by N. Amitay et al in 1981 International Symposium on Antennas and Propagation, Vol. II, June 16-19, 1981, Los Angeles, Calif. at page 465, a multibeam array antenna including a linear array with properly phased elements is suggested which can be made to accurately track a 60 degree segment of the geosynchronous equatorial arc by scanning other than in cardinal planes of the array.

The problem remaining in the prior art is to provide an antenna capable of scanning a wide angle of a predetermined arc in the far field of the antenna using a linear scan of a beam including orthogonally polarized signals while substantially eliminating polarization mismatch at any array caused by a polarization diplexer when scanning is performed outside the cardinal planes of an array since polarizations do not remain orthogonal in such arrangement.

SUMMARY OF THE INVENTION

The foregoing problem has been solved in accordance with the present invention which relates to an antenna arrangement including a phased array which has a fixed phase taper along one axis across the face of the array and a selective phase taper along a second orthogonal axis across the face of the array to provide a beam including signals with a first polarization direction which is squinted at an angle 90 degrees-$\alpha$. A single properly inclined polarization rotator or two properly inclined polarization rotators are provided in the path between the array and a polarization diplexer depending on the direction of polarization and whether the array is a linear or a two-dimensional array to provide the polarization matching at the array.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

A single phased-array antenna can be used to scan a single or dually polarized beam in various directions. However, as was stated hereinbefore, a difficulty arises when beams are required to scan in directions other than in the cardinal planes of the array. In general, when scanning outside the cardinal planes, the polarizations do not remain orthogonal. Typical means of restoring orthogonally, such as two arrays used in conjunction with a quasi-optical polarization diplexer or differential amplitude and phase compensation techniques, introduce loss. In the case of the diplexer arrangement, the loss results from the polarization of the wave reflected from the diplexer not matching the polarization of the array feed thereby introducing loss as the beam is scanned outside the cardinal planes. In accordance with the present invention, however, such polarization mismatch loss can be practically eliminated.

Figure 1:
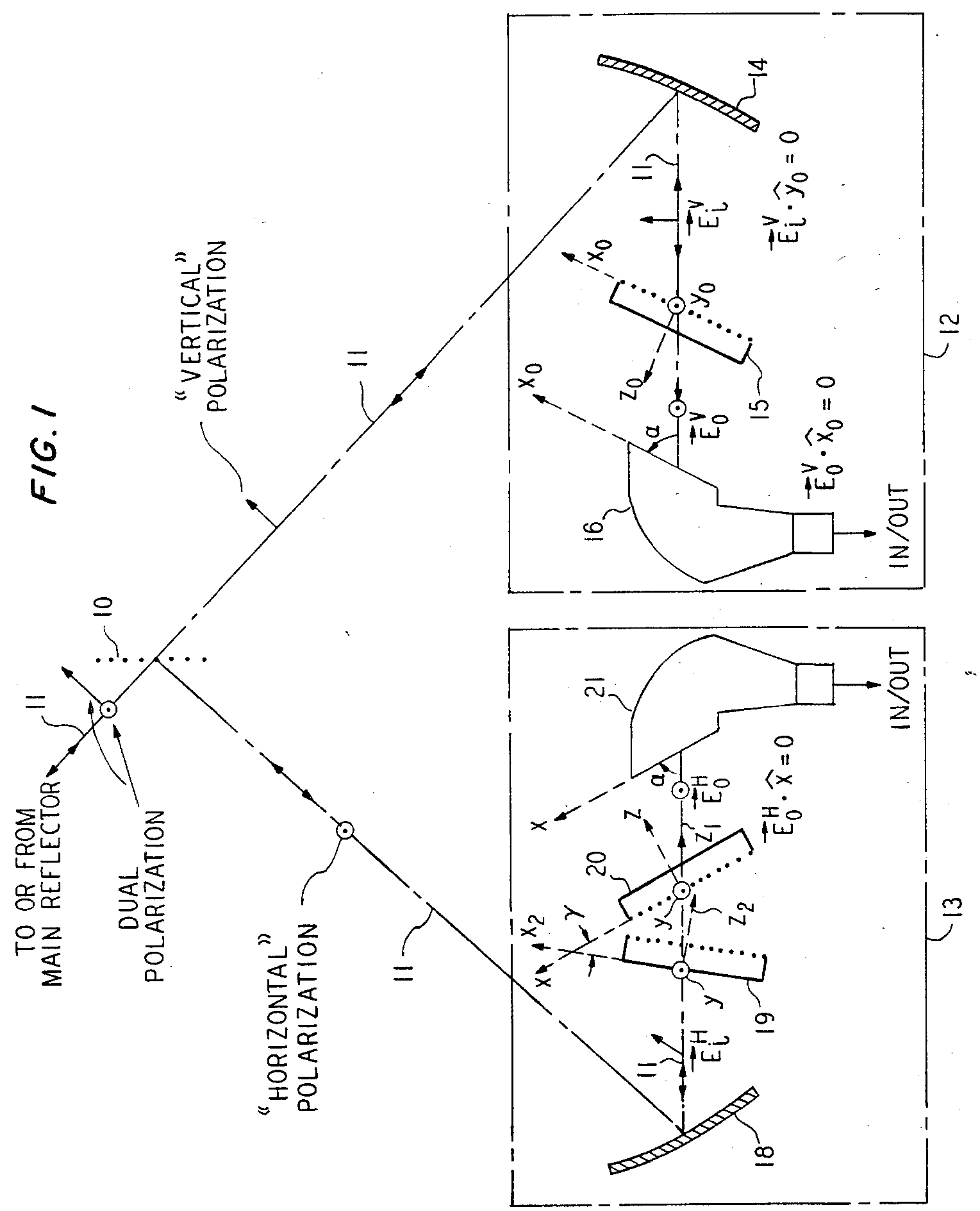
FIG. 1 illustrates a dually polarized linear feed arrangement for an antenna which provides squinted beams to track a wide-angle arc in the far field while correcting for polarization mismatch.

FIG. 1 depicts a general layout of a dually polarized reflector antenna arrangement in accordance with the present invention which comprises a well-known quasi-optical polarization diplexer 10 disposed along a feed axis 11 of the antenna arrangement between a main focusing reflector (not shown) and a first and a second feed arrangement designated 12 and 13, respectively, for receiving or transmitting a respective first and second linearly polarized signal in a beam of electromagnetic energy. In the exemplary arrangement of FIG. 1, polarization diplexer 10 is arranged to pass a vertically polarized signal between the main reflector and first feed arrangement 12 and to reflect a horizontally polarized signal between the main reflector and second feed arrangement 13.

Figure 4:
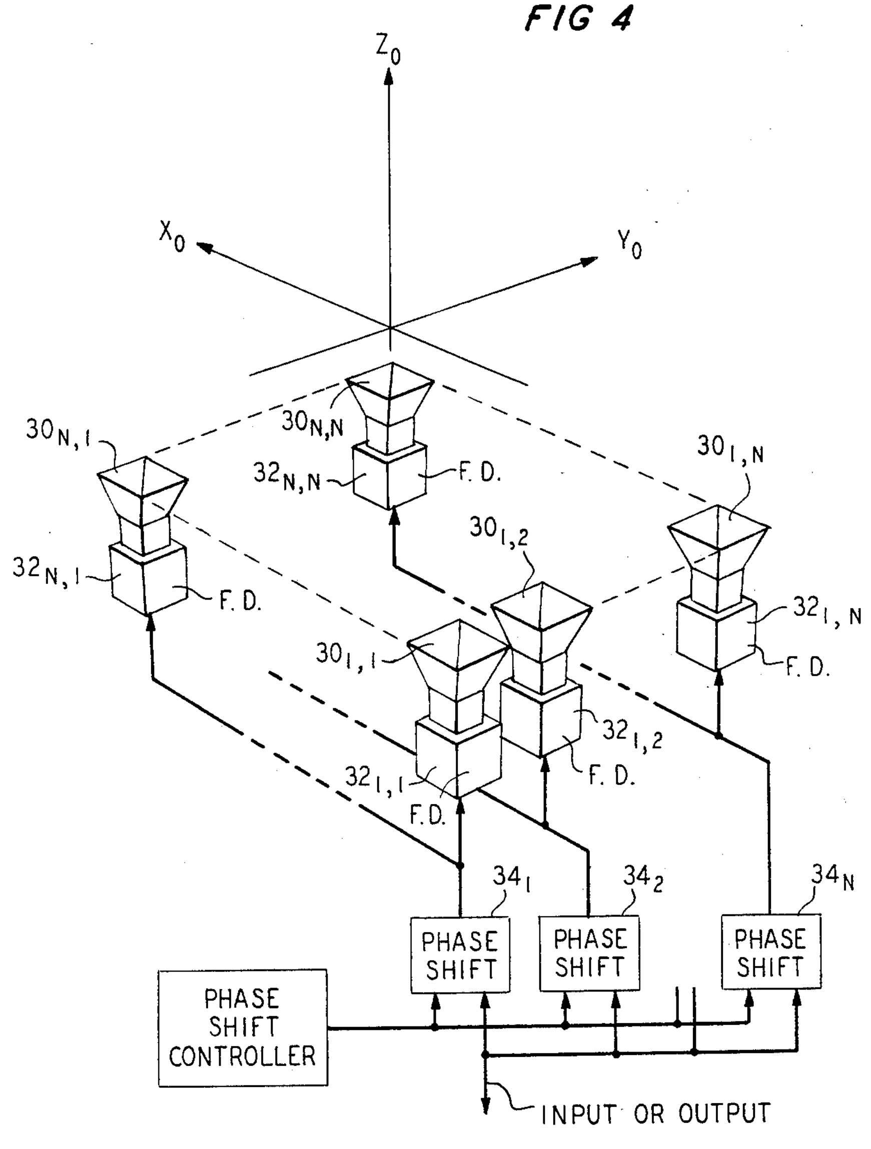
FIG. 4 illustrates an N×N array for use in the arrays of FIG. 1.

First feed arrangement 12 is shown as comprising a subreflector 14, a polarization rotator 15 and a linear feed array 16. Feed array 16 includes a plurality of horn reflectors aligned perpendicular to the plane of the paper with corresponding bias-cut apertures at an acute angle $\alpha$ to the feed axis 11 to produce a beam squint of 90 degrees-$\alpha$. A typical linear phased array including a line of horn reflectors with bias-cut apertures usable for array 16 is shown and described in U.S. Pat. No. 4,413,263 issued to the present inventors on Nov. 1, 1983 to provide a properly squinted beam capable of linearly scanning along a wide angle of an orbital arc segment. It should also be understood that array 16 can comprise a two-dimensional N×N array which provides a properly squinted beam capable of scanning linearly along a wide angle of an orbital arc as described in U.S. Pat. No. 4,458,247 issued to N. Amitay on July 3, 1984 as shown in FIG. 4 with feedhorns 30, fixed delay means 32 and phase shifters 34. It should be noted that polarization rotator 15 is well known in the art and can comprise a plurality of metallic wire grids which are slightly rotated around a common axis with respect to one another along the grid series to rotate the polarization as shown in, for example, U.S. Pat. No. 2,554,936 issued to R. L. Burtner on May 29, 1951 or any other suitable arrangement. Additionally, polarization rotator 15 is disposed approximately parallel to the bias-cut aperture of feed array 16 at an angle $\alpha$ to feed axis 11 for rotating the vertically polarized signal passed by diplexer 10 and reflected by subreflector 14 into a horizontally polarized signal at the aperture of feed array 16 while providing polarization matching at the array.

Second feed arrangement 13 is shown as comprising a subreflector 18, a first polarization rotator 19, a second polarization rotator 20 and a linear feed array 21. Feed array 21 includes a plurality of horn reflectors aligned perpendicular to the plane of the paper with corresponding bias cut apertures at an acute angle $\alpha$ to feed axis 11 to produce a beam squint of 90 degrees-$\alpha$ as was provided with feed array 16 of first feed arrangement 12. Second polarization rotator 20 is disposed approximately parallel to the bias-cut aperture of feed array 21 at an angle $\alpha$ to feed axis 11 similar to the orientation of polarization rotator 15 with feed array 16. The aperture of polarization rotator 19 is disposed at an angle $\gamma$ to the aperture of second polarization rotator 20 and converts a $H_y=0$ type of horizontally polarizer signal reflected by diplexer 10 and subreflector 18 into a vertically polarized signal while second polarization rotator 20 converts this vertically polarized signal back into an $E_x=0$ type of horizontally polarized signal for reception by feed array 21 with virtually no polarization mismatch between diplexer 10 and feed array 21.

For a clear understanding of the present invention, the received wave coming from the main reflector in FIG. 1 is split by the polarization diplexer 10 into separate paths for the vertical and horizontal polarizations. These two orthogonal polarizations may, in fact, be linear combinations of originally transmitted orthogonal polarizations from a remote location. There are well-known relatively simple methods for processing the outputs of the two arrays 16 and 21 and recovering the originally transmitted signals. However, if the two polarizations produced by diplexer 10 are not matched to the feeds of arrays 16 and 21, a signal loss results which cannot be recovered by these processing techniques. The bias-cut horn elements of the two arrays 16 and 21 are polarized such that they can only receive fields which are perpendicular to the x and $x_0$ directions, respectively, shown in FIG. 1 without polarization mismatch loss. Therefore, the vertical polarization has to be appropriately rotated in order to be received by the array 16. This is accomplished by the polarization rotator 15 in an arrangement as described briefly in, for example, the abstract entitled "Broadband, Wide-Angle, Quasi-Optical Polarization Rotators" by N. Amitay et al in URSI, National Radio Science Meeting of Jan. 13-15, 1982, Boulder, Col. at page 53, and described hereinbefore in more detail to its use with regard to the present antenna feed arrangement which includes bias-cut horns and squinted beams combined with a frequency diplexer 10.

Figure 2:
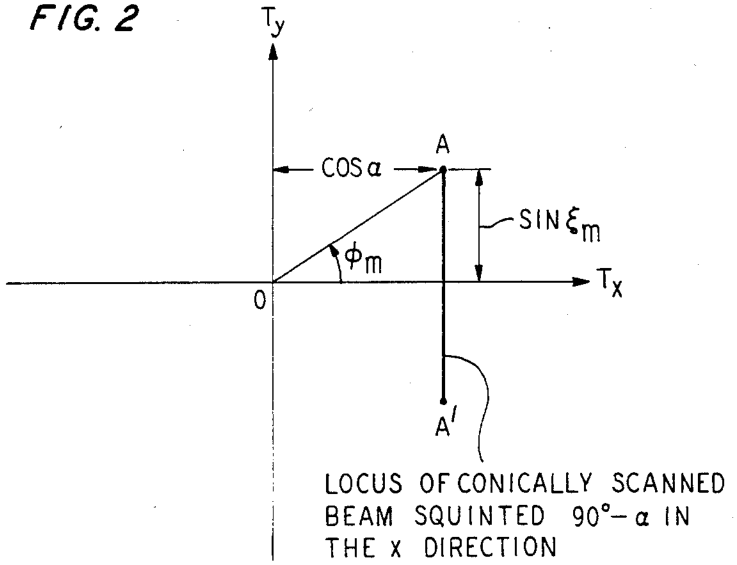
FIG. 2 illustrates a directional cosine coordinate system of an array of antenna elements in FIG. 1.

As was described in U.S. Pat. No. 4,413,263 issued to the present inventors on Nov. 1, 1983, a linear scan can be utilized for a multisatellite system when the satellite locations lie in either the cardinal plane of the array directional cosine coordinate system or in a plane substantially parallel to a cardinal plane of the array directional cosine coordinate system as shown in FIG. 2. The directional cosine coordinate system of an antenna can be derived using well known mathematical principles. The orientation of the satellites in a plane substantially parallel to a cardinal plane is preferable since the beam of the antenna can be scanned to track the Geosynchronous Equatorial Arc (GEA) segment and all satellites located in that segment and no antenna reorientation is necessary if a satellite is moved or replaced by another satellite in another location on the arc segment and only a modification of the beam forming system is necessary. From the URSI, National Radio Science Meeting abstract of N. Amitay et al cited hereinbefore, it has been shown that, for a plane wave incident on a multigrid filter or polarization rotator, $E_i^H$ in FIG. 1, the portion of the wave that is transmitted through the first (input) grid can be made to emerge from the final (output) grid with negligible loss. The portion of $E_i^H$ reflected from the first grid of polarization rotator 19 cannot be recovered and manifests itself as a reduction of antenna gain for this polarization. Therefore, the polarization mismatch loss will hereinafter be equated to the transmission loss of a single grid identical in structure to the first grid of polarization rotator 19.

Figure 3:
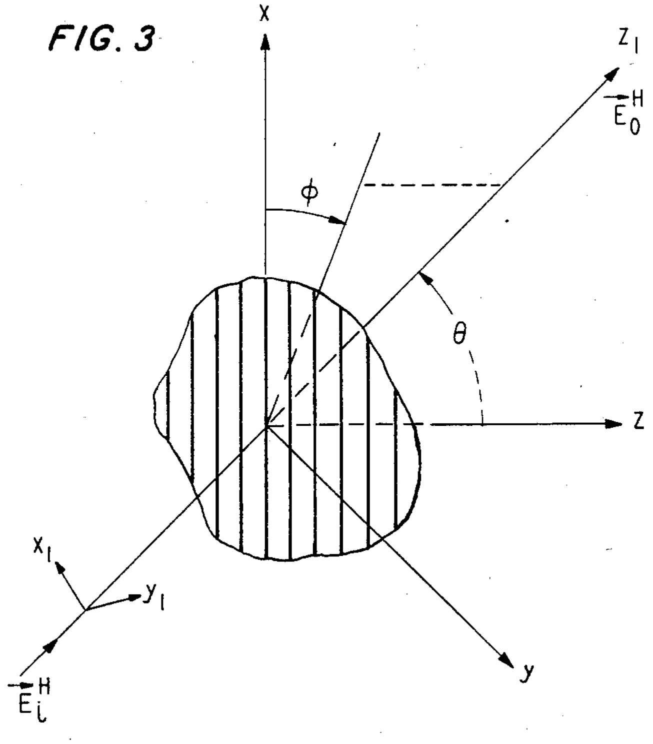
FIG. 3 shows a single polarization grid geometry with the metallic strips parallel to the x axis.

FIG. 3 shows a single grid of thin metallic strips parallel to the x axis. The coordinate system of the plane wave are $\{x_1,y_1,z_1\}$. The wave propagates in the $z_1$ direction, which is defined by the polar angles $\{\theta,\phi\}$ in the $\{x,y,z\}$ coordinates, or alternatively by the direction cosines, $$T_x=\sin\theta\cos\phi;\ T_y=\sin\theta\sin\phi;\ T_z=\cos\theta. \quad (1)$$

The incident electromagnetic field is characterized by $$\vec{H}_i^H=\hat{x}_1H;\ \vec{E}_i^H=\sqrt{\frac{\mu}{\epsilon}}\ \vec{H}_i^H\times\hat{z}_1=-\hat{y}_1Z_0H, \quad (2)$$

where $\hat{x}_1$, $\hat{y}_1$, and $\hat{z}_1$ are unit vectors in their respective directions, $\mu$ and $\epsilon$ are the permeability and dielectric constant of the propagation medium, and $\sqrt{\mu/\epsilon}=Z_0$.

Due to the properties of the polarization diplexer 10 in FIG. 1, the incident magnetic field of the 'horizontal' polarization, $\vec{H}_i^H$, has no y component. This fact determines the $x_1$ and $y_1$ axes relative to the {x,y,z} coordinates since $$(\vec{H}_i^H \cdot \hat{y}) = H(\hat{x}_1 \cdot \hat{y}) = 0. \quad (3)$$

Expressing $\hat{x}_1$, $\hat{y}_1$ and $\hat{z}_1$ in terms of the unit vectors of the grid coordinate system {x,y,z}, then $$\hat{x}_1 = (\hat{x} - \hat{z}\tan\theta\cos\phi)/N \quad (4)$$

$$\hat{y}_1 = \left\{ -\left[\frac{\sin^2\theta\sin\phi\cos\phi}{\cos\theta}\right]\hat{x} + \left[\frac{\sin^2\theta\cos^2\phi}{\cos\theta} + \cos\theta\right]\hat{y} - \sin\theta\sin\phi\hat{z} \right\}/N.$$

$$\hat{z}_1 = \sin\theta\cos\phi\hat{x} + \sin\theta\sin\phi\hat{y} + \cos\theta\hat{z}.$$

where $N = \sqrt{1 + \tan^2\theta\cos^2\phi}$ .

The portion of the incident field that will be transmitted through the screen will be designated by $E_v$. Such portion will be orthogonal to the direction of the metallic wires of the grid and to the direction of propagation, i.e., $$\hat{v} = \hat{x}\times\hat{z}_1/|\hat{x}\times\hat{z}_1|. \quad (5)$$

$\beta$ will be defined as the angle between v and the $-y_1$ axis. Then equations (4) and (5) give $$\tan\beta = [\sin^2\theta\sin\phi\cos\phi]/\cos\theta. \quad (6)$$

The power transmission coefficient of the grid will be $$T_r = |E_v/E_i^H|^2 = \cos^2\beta, \quad (7)$$

where $\beta$ is obtained from equations (5) and (6). Utilizing equations (1) and (6) in equation (7) provides $$T_r = [1 + (T_x^2T_y^2/T_z^2)]^{-1} = [1 + T_x^2T_y^2/(1 - T_x^2 - T_y^2)]^{-1} \quad (8)$$

such that the transmission coefficient of the grid is given in terms of the direction cosines corresponding to the coordinates of the grid. It should be noted that for broadside ($\theta=0$ degrees) and cardinal planes of scan ($\theta=0$ degrees or $\theta=90$ degrees), there is no loss in transmission; i.e., $T_r=1$.

If polarization rotators 19 and 20 in FIG. 1 are removed, the aperture of linear array 21 of bias-cut horn-reflectors could be viewed as a planar grid shown in FIG. 3. As mentioned hereinbefore, the horns are cut at a bias angle $\alpha$ to provide the vertical beam squint needed to cause the beam to track the geosynchronous satellite arc as it is scanned in azimuth. This bias angle will vary with geographic location of the earth station. Thus by inserting the proper values of the conical scan locus A—A' of FIG. 2 into equation (8), the reduction in antenna gain of the uncorrected horizontal polarization feed of array 21 is obtained.

When polarization rotators 19 and 20 are present, the transmission is calculated in terms of the {$x_2$,$y_2$,$z_2$} coordinates introduced by a $-\gamma$ rotation of the {x,y,z} coordinates around the y axis. The directional cosines of the {$x_2$,$y_2$,$z_2$} coordinates can be expressed as $$\left.\begin{aligned} T_{x2} &= T_x\cos\gamma - T_z\sin\gamma, \\ T_{y2} &= T_y, \\ T_{z2} &= T_x\sin\gamma + T_z\cos\gamma. \end{aligned}\right\} \quad (9)$$

Therefore, equation (9) provides directions for any tilt $\gamma$ of the grid (first grid rotator) and then the angle $\gamma$ is adjusted with the direction cosines in equation (8) to give a maximum transmission coefficient, $T_r$, over the full scan range.

We claim:

1. An antenna feed arrangement comprising:

a plurality of feed elements arranged in an array and capable of launching or receiving a beam of electromagnetic energy polarized in a first direction, the array including a fixed linear phase taper along a first axis across the aperture of the array to cause the beam to be squinted at an angle 90 degrees-$\alpha$;

phase shifting means connected to the plurality of feed elements and capable of selectively producing a predetermined linear phase taper along a second axis across the aperture of the array for causing the squinted beam to traverse a predetermined arc in the far field of the antenna arrangement when scanned along the second axis of the array orthogonal to the first axis;

polarization diplexing means capable of bidirectionally directing orthogonally polarized signals along one path in the far field of the antenna arrangement and along first and second separate paths in the near field of the antenna arrangement for interception along the first one of the paths by the array of feed elements;

first polarization rotating means disposed between the diplexing means and the array with the surface normal vector of the polarization rotating means at an angle to a ray directed from the center of the aperture of the array to the center of the far field of view of the antenna arrangement which substantially corresponds to the angle of squint of the beam generated by the array, the polarization rotating means being capable of rotating a signal polarized in a first direction at the aperture of the array into a signal polarized in a second direction; and second polarization rotating means disposed between the diplexing means and the first polarization rotating means at a predetermined acute angle $\gamma$ to the first polarization rotating means, the second polarization rotating means being capable of rotating a signal polarized in the second direction from the first polarization rotating means into a signal polarized in the first direction which is matched to the polarization of the beam received from the diplexing means along the first separate path.

2. A feed arrangement according to claim 1 wherein the feed arrangement further comprises:

a second plurality of feed elements arranged in a second array capable of launching or receiving a beam of electromagnetic energy polarized in the first direction, the second array including a fixed linear phase taper along a first axis across the aperture of the second array to cause the beam to be squinted at an angle of 90 degrees-$\alpha$;

second phase shifting means capable of selectively producing a predetermined linear phase taper along a second axis across the aperture of the second array for causing the squinted beam to transverse a predetermined arc in the far field of the antenna arrangement when scanned along the second axis of the second array orthogonal to the first axis;

third polarization rotating means disposed between the diplexing means and the second array with a surface normal vector of the third polarization rotating means at an angle to a ray directed from the center of the aperture of the second array to the center of the far field of view of the antenna arrangement which substantially corresponds to the angle of squint of the beam generated by the second array, the third polarization rotating means being capable of rotating a signal polarized in a first direction at the aperture of the second array into a signal polarized in a second direction which is matched to the polarization of the beam received from the diplexing means along the second separate path.

3. An antenna feed arrangement according to claim 1 wherein the arrangement further comprises:

a reflector disposed along said first one of the paths between the diplexing means and the combination of the first and second polarization rotating means for reflecting the beam including the first polarization direction signal between the diplexing means and the combination of the first and second polarization rotating means.

4. An antenna feed arrangement according to claim 2 wherein the arrangement further comprises:

a reflector disposed along said second one of the separate paths between the diplexing means and the third polarization rotating means for reflecting the beam including the second polarization direction signal between the diplexing means and the third polarization rotating means.

* * * * *